(12) United States Patent
Husband et al.

(10) Patent No.: US 9,666,336 B2
(45) Date of Patent: May 30, 2017

(54) TERMINATION UNIT

(71) Applicant: ROLLS-ROYCE plc, London (GB)

(72) Inventors: Stephen Mark Husband, Derby (GB); Paul Robert Miller, Derby (GB); Alexander Charles Smith, Manchester (GB); Peter Malkin, Chester (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/049,244

(22) Filed: Feb. 22, 2016

(65) Prior Publication Data

US 2016/0276068 A1    Sep. 22, 2016

(30) Foreign Application Priority Data

Mar. 16, 2015    (GB) .................... 1504357.3

(51) Int. Cl.
*H01B 12/00*    (2006.01)
*H01B 12/16*    (2006.01)
*H01R 4/68*    (2006.01)
*H02G 15/34*    (2006.01)
*H01R 4/01*    (2006.01)
*H01R 4/62*    (2006.01)
(Continued)

(52) U.S. Cl.
CPC .............. *H01B 12/16* (2013.01); *H01R 4/01* (2013.01); *H01R 4/68* (2013.01); *H02G 15/34* (2013.01); *H01R 4/62* (2013.01); *H01R 25/00* (2013.01); *H02G 15/06* (2013.01); *Y02E 40/648* (2013.01)

(58) Field of Classification Search
CPC ........ H01B 12/16; H01B 17/56; H01B 17/58; H01B 17/583; H01F 6/065; H01L 39/16; H01R 4/01; H01R 4/62; H01R 4/68; H01R 25/00; H02G 3/22; H02G 15/06; H02G 15/34; Y02E 40/648
USPC ..................... 174/15.5, 125.1, 650
See application file for complete search history.

(56) References Cited

U.S. PATENT DOCUMENTS 3,727,173 A    4/1973    Goldmann et al.
4,734,047 A    3/1988    Krumme
(Continued)

FOREIGN PATENT DOCUMENTS

EP    1 848 063 A1    10/2007
JP    H05-29136 A    2/1993

OTHER PUBLICATIONS

Jul. 7, 2016 Search Report issued in European Patent Application No. 16156469.
(Continued)

*Primary Examiner* — Timothy Thompson
*Assistant Examiner* — Guillermo Egoavil
(74) *Attorney, Agent, or Firm* — Oliff PLC

(57) ABSTRACT

A termination unit for a superconductor network. Including a primary system that includes a first superconductor cable. Also a first superconducting coil and a first auxiliary magnetizing coil, each coil wound around the first superconductor cable. Also a terminal including a first leg, the first leg including an aperture configured to receive the first superconductor cable. The first leg defining a clearance about the first superconductor cable at ambient temperature and arranged to firmly clamp onto the first superconductor cable at a cryogenic temperature. The termination unit including a cooling system arranged to enclose and cool the primary system to cryogenic temperatures.

19 Claims, 4 Drawing Sheets

(51) Int. Cl.
  *H01R 25/00* (2006.01)
  *H02G 15/06* (2006.01)

(56) References Cited

U.S. PATENT DOCUMENTS

| | | | | |
|---|---|---|---|---|
| 2008/0110659 A1* | 5/2008 | Ashibe | .................... | H01R 4/68 |
| | | | | 174/15.5 |
| 2013/0199821 A1* | 8/2013 | Teng | ..................... | H02G 15/34 |
| | | | | 174/125.1 |
| 2014/0262492 A1* | 9/2014 | Tekletsadik | ............ | H01L 39/16 |
| | | | | 174/650 |

OTHER PUBLICATIONS

"Superconducting Low Voltage Direct Current (LVDC) Networks," University of Wisconsin, Madison, Wisconsin, EPRI TR-103636, Apr. 1994.

Sep. 10, 2015 Search Report issued in British Patent Application No. 1504357.3.

\* cited by examiner

TERMINATION UNIT

The present disclosure concerns a termination unit suitable for coupling superconductors in a superconductor network at cryogenic temperatures. It also concerns a superconductor network including a termination unit.

A termination unit is used in a superconductor network to couple a superconductor to another component. Typically a termination unit provides a controlled environment to couple the superconductor, which operates at cryogenic temperatures, to another component at ambient temperature. Where two superconductors are to be coupled together, they are coupled indirectly via a component that is at ambient temperature.

A disadvantage of such a termination unit is that the cooling losses to transition between cryogenic and ambient temperatures are large and may be prohibitive, particularly where the environment must transition from cryogenic to ambient and back to cryogenic. Such transition is also complex to manage and requires heavy and/or bulky components.

Another disadvantage of the typical termination units is that the voltage capacity is governed by the ambient temperature components. Thus the whole arrangement must operate at a higher voltage and lower current than the superconductors can achieve. This limits the use of superconductor networks in some applications, including aircraft, because management of potential electrical discharges is too complex, heavy, bulky and/or costly.

According to a first aspect of the invention there is provided a termination unit for a superconductor network, the termination unit comprising a primary system that comprises:
 a first superconductor cable;
 a terminal comprising a first leg, the first leg comprising an aperture configured to receive the first superconductor cable, the first leg defining a clearance about the first superconductor cable at ambient temperature and arranged to firmly clamp onto the first superconductor cable at a cryogenic temperature;
 and the termination unit comprising a cooling system arranged to enclose and cool the primary system to cryogenic temperatures.

Advantageously the termination unit permits connection of superconducting components together without any ambient temperature portions. Thus the termination unit enables fully superconducting networks to be used in a variety of applications.

Advantageously the terminal is mechanically isolated from the first superconductor cable at ambient temperatures, due to the clearance. Advantageously this means that it is easy to install the first superconductor cable into the termination unit and to remove it for maintenance or to replace it.

The primary system may further comprise a first superconducting coil and a first auxiliary magnetising coil, each coil wound around the first superconductor cable.

Advantageously the first superconducting coil acts as a fuse which quenches first in the event of an excessive temperature, current or magnetic field. The quench increases the resistance and impedance of the coil, and therefore heats the first leg so that the clearance opens and the terminal becomes mechanically isolated. Advantageously this fuse property means that it will be known which components must be replaced to reset the termination unit for further use.

The primary system may further comprise:
 a second superconductor cable; and
 the terminal comprising a second leg, the second leg comprising an aperture configured to receive the second superconductor cable, the second leg defining a clearance about the second superconductor cable at ambient temperature and arranged to firmly clamp onto the second superconductor cable at a cryogenic temperature.

Advantageously the terminal is mechanically isolated from the second superconductor cable at ambient temperatures, due to the clearance. Advantageously this means that it is easy to install the second superconductor cable into the termination unit and to remove it for maintenance or to replace it.

The primary system may further comprise a second superconducting coil and a second auxiliary magnetising coil, each coil wound around the second superconductor cable.

Advantageously the second superconducting coil acts as a fuse which quenches second in the event of an excessive temperature, current or magnetic field. The quench increases the resistance and impedance of the coil, and therefore heats the second leg so that the clearance opens and the terminal becomes mechanically isolated. Advantageously this fuse property means that it will be known which components must be replaced to reset the termination unit for further use.

The first superconductor cable, optional first superconducting coil and optional first auxiliary magnetising coil may form an input to the terminal. The second superconductor cable, optional second superconducting coil and optional second auxiliary magnetising coil may form an output to the terminal. There may be more than one input to the terminal, each having the form of the first superconductor cable. Each may include the optional first superconducting coil and optional first auxiliary magnetising coil. There may be more than one output to the terminal, each having the form of the second superconductor cable. Each may include the optional second superconducting coil and optional second auxiliary magnetising coil.

The primary system may further comprise:
 a third superconductor cable; and
 the terminal comprising a third leg, the third leg comprising an aperture configured to receive the third superconductor cable, the third leg defining a clearance about the third superconductor cable at ambient temperature and arranged to firmly clamp onto the third superconductor cable at a cryogenic temperature.

Advantageously the terminal is mechanically isolated from the third superconductor cable at ambient temperatures, due to the clearance. Advantageously this means that it is easy to install the third superconductor cable into the termination unit and to remove it for maintenance or to replace it.

The primary system may further comprise a third superconducting coil and a third auxiliary magnetising coil, each coil wound around the third superconductor cable.

Advantageously the third superconducting coil acts as a fuse which quenches third in the event of an excessive temperature, current or magnetic field. The quench increases the resistance and impedance of the coil, and therefore heats the third leg so that the clearance opens and the terminal becomes mechanically isolated. Advantageously this fuse property means that it will be known which components must be replaced to reset the termination unit for further use.

The third superconductor cable, optional third superconducting coil and optional third auxiliary magnetising coil may form an output to the terminal.

The primary system may further comprise a switch configured to switch current flow between the second and third superconductor cables. Advantageously it may switch the current by controlling the magnetic field generated by one or both of the second and third auxiliary magnetising coils. There may be a control system, the control system configured to control the switch. The control system may be located in or with the termination unit. Alternatively it may be located remotely from the termination unit.

There may be one switch for each superconducting coil. Advantageously greater control of each coil can be achieved. Alternatively there may be one switch for both the second and third superconducting coils. Advantageously there are fewer components and the coils may be controlled in opposition.

Turns of each superconducting coil may alternate with turns of the respective auxiliary magnetising coil. Thus turns of the first superconducting coil may alternate with turns of the first auxiliary magnetising coil. Turns of the second superconducting coil may alternate with turns of the second auxiliary magnetising coil. Turns of the third superconducting coil may alternate with turns of the third auxiliary magnetising coil. Alternatively turns of each auxiliary magnetising coil may be wound around turns of the respective superconducting coil. Thus turns of the first auxiliary magnetising coil may be wound around turns of the first superconducting coil. Turns of the second auxiliary magnetising coil may be wound around turns of the second superconducting coil. Turns of the third auxiliary magnetising coil may be wound around turns of the third superconducting coil.

Each superconducting coil and respective auxiliary magnetising coil may be wound about a former. Thus the first superconducting coil and the first auxiliary magnetising coil may be wound about a former. The second superconducting coil and the second auxiliary magnetising coil may be wound about a former. The third superconducting coil and the third auxiliary magnetising coil may be wound about a former. The former may comprise a metal or metal alloy, for example alumina. The former may comprise a ceramic, for example anodised aluminium. The former may comprise a plastic, for example epoxy resin. The former may comprise a composite material, for example a glass reinforced composite material. Advantageously the former orientates the superconducting coil and auxiliary magnetising coil correctly. Advantageously the former provides a controlled temperature for the coils. Advantageously the former mechanically supports the coils, particularly during quench.

The termination unit may further comprise a cooling manifold arranged to deliver coolant to the cooling system.

The cooling system may be arranged into a first zone enclosing and cooling the terminal. The cooling system may be further arranged into a second zone enclosing and cooling the superconducting coils and the auxiliary magnetising coils.

Advantageously the zones may be arranged to be at different temperatures. Advantageously the second zone may be warmer than the first zone so that the superconducting coils preferentially quench in the event of a failure, thereby protecting the terminal and components connected to the termination unit.

The cooling system may further comprise a third zone configured to interface between the termination unit and a superconducting component outside the termination unit. The superconducting component may be a continuation of the superconductor cable or another component.

The termination unit may comprise a secondary system that comprises:
  a fourth superconductor cable; and
  a second terminal comprising a fourth leg, the fourth leg comprising an aperture configured to receive the fourth superconductor cable, the fourth leg defining a clearance about the fourth superconductor cable at ambient temperature and arranged to firmly clamp onto the fourth superconductor cable at a cryogenic temperature.

Advantageously the second terminal is mechanically isolated from the fourth superconductor cable at ambient temperatures, due to the clearance. Advantageously this means that it is easy to install the fourth superconductor cable into the termination unit and to remove it for maintenance or to replace it.

The secondary system may further comprise a fourth superconducting coil and a fourth auxiliary magnetising coil, each coil wound around the fourth superconductor cable.

Advantageously the fourth superconducting coil acts as a fuse which quenches fourth in the event of an excessive temperature, current or magnetic field. The quench increases the resistance and impedance of the coil, and therefore heats the fourth leg so that the clearance opens and the second terminal becomes mechanically isolated. Advantageously this fuse property means that it will be known which components must be replaced to reset the termination unit for further use.

The termination unit may comprise a cooling system arranged to enclose and cool the secondary system to cryogenic temperatures. The cooling system may be the same as that used to enclose and cool the primary system. Alternatively the cooling system may be a separate system that is arranged to enclose and cool the secondary system independently to the primary system cooling.

The secondary system may further comprise:
  a fifth superconductor cable; and
  the second terminal comprising a fifth leg, the fifth leg comprising an aperture configured to receive the fifth superconductor cable, the fifth leg defining a clearance about the fifth superconductor cable at ambient temperature and arranged to firmly clamp onto the fifth superconductor cable at a cryogenic temperature.

Advantageously the second terminal is mechanically isolated from the fifth superconductor cable at ambient temperatures, due to the clearance. Advantageously this means that it is easy to install the fifth superconductor cable into the termination unit and to remove it for maintenance or to replace it.

The secondary system may further comprise a fifth superconducting coil and a fifth auxiliary magnetising coil, each coil wound around the fifth superconductor cable.

Advantageously the fifth superconducting coil acts as a fuse which quenches fifth in the event of an excessive temperature, current or magnetic field. The quench increases the resistance and impedance of the coil, and therefore heats the fifth leg so that the clearance opens and the second terminal becomes mechanically isolated. Advantageously this fuse property means that it will be known which components must be replaced to reset the termination unit for further use.

The fourth superconductor cable, optional fourth superconducting coil and optional fourth auxiliary magnetising coil may form an input to the second terminal. The fifth superconductor cable, optional fifth superconducting coil and optional fifth auxiliary magnetising coil may form an output to the second terminal. There may be more than one input to the second terminal, each having the form of the fourth superconductor cable. Each may include the optional fourth superconducting coil and optional fourth auxiliary magnetising coil. There may be more than one output to the second terminal, each having the form of the fifth superconductor cable. Each may include the optional fifth superconducting coil and optional fifth auxiliary magnetising coil.

The secondary system may further comprise:
a sixth superconductor cable; and
the second terminal comprising a sixth leg, the sixth leg comprising an aperture configured to receive the sixth superconductor cable, the sixth leg defining a clearance about the sixth superconductor cable at ambient temperature and arranged to firmly clamp onto the sixth superconductor cable at a cryogenic temperature.

Advantageously the second terminal is mechanically isolated from the sixth superconductor cable at ambient temperatures, due to the clearance. Advantageously this means that it is easy to install the sixth superconductor cable into the termination unit and to remove it for maintenance or to replace it.

The secondary system may further comprise a sixth superconducting coil and a sixth auxiliary magnetising coil, each coil wound around the sixth superconductor cable.

Advantageously the sixth superconducting coil acts as a fuse which quenches sixth in the event of an excessive temperature, current or magnetic field. The quench increases the resistance and impedance of the coil, and therefore heats the sixth leg so that the clearance opens and the second terminal becomes mechanically isolated. Advantageously this fuse property means that it will be known which components must be replaced to reset the termination unit for further use.

The sixth superconductor cable, optional sixth superconducting coil and optional sixth auxiliary magnetising coil may form an output to the terminal.

The secondary system may further comprise a switch configured to switch current flow between the fifth and sixth superconductor cables. Advantageously it may switch the current by controlling the magnetic field generated by one or both of the fifth and sixth auxiliary magnetising coils. There may be a control system, the control system configured to control the switch. The control system may be located in or with the termination unit. Alternatively it may be located remotely from the termination unit. The control system may be common to the primary and secondary systems. Alternatively separate control systems may be provided for each of the primary and secondary systems.

There may be one switch for each superconducting coil. Advantageously greater control of each coil can be achieved. Alternatively there may be one switch for both the fifth and sixth superconducting coils. Advantageously there are fewer components and the coils may be controlled in opposition.

One switch may act on both the second and the fifth superconducting coils. Another switch may act on both the third and the sixth superconducting coils. Alternatively one switch may act on all four of these superconducting coils. Advantageously the superconducting coils in both the primary and secondary systems may be switched together.

Turns of each superconducting coil may alternate with turns of the respective auxiliary magnetising coil. Thus turns of the fourth superconducting coil may alternate with turns of the fourth auxiliary magnetising coil. Turns of the fifth superconducting coil may alternate with turns of the fifth auxiliary magnetising coil. Turns of the sixth superconducting coil may alternate with turns of the sixth auxiliary magnetising coil. Alternatively turns of each auxiliary magnetising coil may be wound around turns of the respective superconducting coil. Thus turns of the fourth auxiliary magnetising coil may be wound around turns of the fourth superconducting coil. Turns of the fifth auxiliary magnetising coil may be wound around turns of the fifth superconducting coil. Turns of the sixth auxiliary magnetising coil may be wound around turns of the sixth superconducting coil.

Each superconducting coil and respective auxiliary magnetising coil may be wound about a former. Thus the fourth superconducting coil and the fourth auxiliary magnetising coil may be wound about a former. The fifth superconducting coil and the fifth auxiliary magnetising coil may be wound about a former. The sixth superconducting coil and the sixth auxiliary magnetising coil may be wound about a former. The former may comprise a metal or metal alloy, for example alumina. The former may comprise a ceramic, for example anodised aluminium. The former may comprise a plastic, for example epoxy resin. The former may comprise a composite material, for example a glass reinforced composite material. Advantageously the former orientates the superconducting coil and auxiliary magnetising coil correctly. Advantageously the former provides a controlled temperature for the coils. Advantageously the former mechanically supports the coils, particularly during quench.

The first superconductor cable may comprise a positive pole and the fourth superconductor cable may comprise a negative pole. This may be for a DC network. The first superconductor cable may comprise a first phase and the fourth superconductor cable may comprise a second phase. This may be for a two-phase AC network.

There may be one or more additional secondary systems. The first superconductor cable may comprise a first phase of a multiphase arrangement and the fourth superconductor cable of each secondary system may comprise a further phase of a multiphase arrangement. Thus in a three-phase AC network, the first superconductor cable may comprise a first phase, the fourth superconductor cable of a first secondary system may comprise a second phase and the fourth superconductor cable of a second secondary system may comprise a third phase.

The cooling system may be arranged to enclose and cool the secondary system to cryogenic temperatures.

Another aspect of the present invention provides a superconductor network including a termination unit as described.

The skilled person will appreciate that except where mutually exclusive, a feature described in relation to any one of the above aspects may be applied mutatis mutandis to any other aspect.

Embodiments of the invention will now be described by way of example only, with reference to the Figures, in which.

Figure 1:
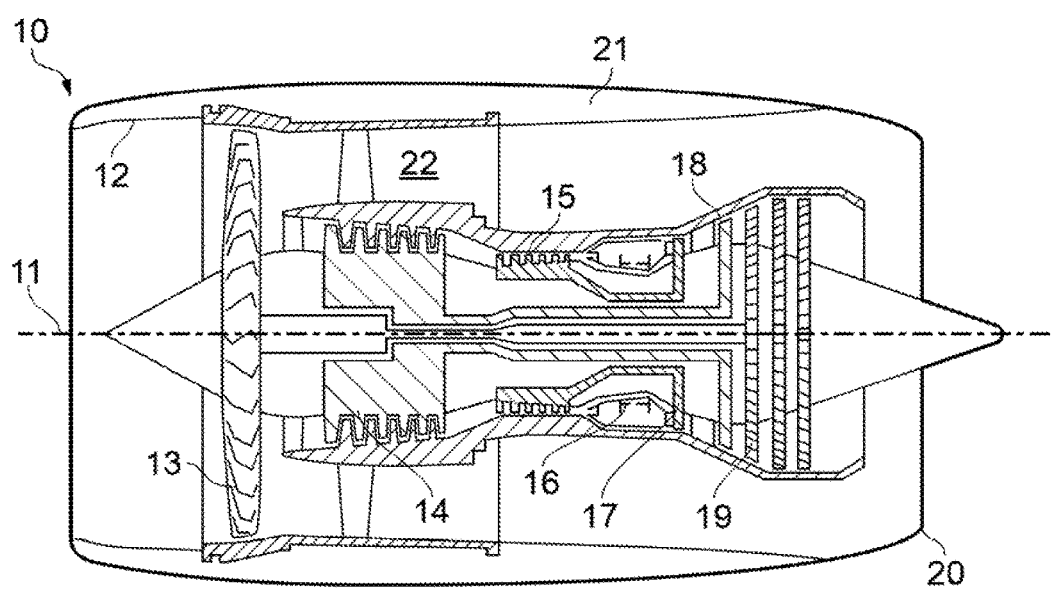
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
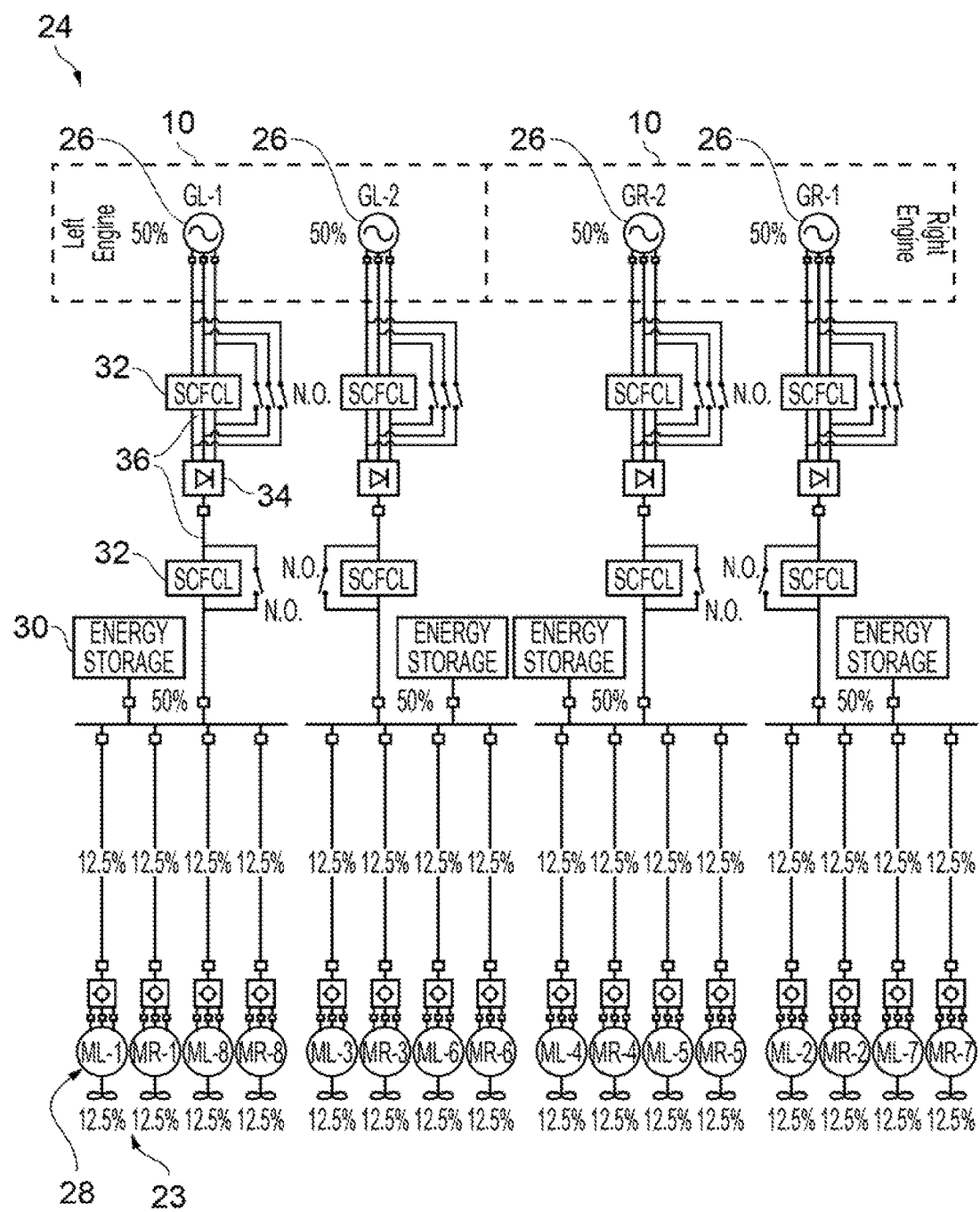
FIG. 2 is a schematic illustration of a distributed propulsion electrical network.

A distributed propulsion electrical network 24 for an aircraft is shown in FIG. 2. This is a DC network. The network 24 is fully superconducting in that all the components operate at and all the connections are made at cryogenic temperatures. An aircraft may have one or more gas turbine engines 10, two are shown, each of which comprises two electrical machines 26 which act as generators. Each generator 26 may supply a plurality of electrical machines 28 which act as motors. The motors 28 may, for example, each drive a propulsive fan 13; the fans 13 are distributed along the wings of an aircraft. The electrical generators 26 may also supply energy storage 30 which can acts as a source of electrical power to the electrical motors 28 when the electrical generators 26 cannot supply sufficient power.

One or more superconducting fault current limiters 32 may be provided between each electrical generator 26 and the electrical motors 28 and energy storage 30 which it supplies. The superconducting fault current limiters 32 offer zero resistance when cooled to cryogenic temperatures. Their resistance rapidly increases as the superconductor within them is heated beyond its critical temperature, or alternatively when the current through them is increased beyond the critical current or the magnetic field applied is increased beyond the critical field.

The network 24 may also include one or more AC/DC cryogenic converters 34.

The cables 36 between pairs of components are all superconducting. The junctions between a cable 36 and a component, or between two cables 36, are formed through a termination unit 38 as will be described in more detail with respect to FIG. 3 and FIG. 4. Thus the distributed propulsion electrical network 24 is a superconducting network and includes a termination unit 38. The termination unit 38 replaces switchgear which is conventionally used to make such connections. Advantageously the termination unit 38 is lighter and more compact than a switchgear assembly.

The termination unit 38 comprises a primary system 39. The primary system 39 comprises a first superconductor cable 40 which has the form of a superconductor. The first superconductor cable 40 is formed in conventional manner having a superconductor core and a metallic sheath around the core. The primary system 39 optionally also comprises a first superconducting coil 42 and a first auxiliary magnetising coil 44. The first superconducting coil 42 may be part of the first superconductor cable 40 or may be coupled thereto. The first auxiliary magnetising coil 44 may be formed of copper. The first superconducting coil 42 and first auxiliary magnetising coil 44 are wound helically around the first superconductor cable 40. The first auxiliary magnetising coil 44 may be wound around the first superconducting coil 42 or may be wound so that turns of each coil 42, 44 alternate.

The primary system 39 also includes a terminal 46. The terminal 46 may be formed from aluminium. It may be solid or may be tubular and thus hollow. The terminal 46 may be braided, particularly to reduce AC losses in an AC network. The terminal 46 includes a first leg 48 which defines an aperture 50. The aperture 50 is elongate in a complementary shape to the end of the first superconductor cable 40. The aperture 50 is configured to define a clearance around the first superconductor cable 40 at ambient temperature. Advantageously it is therefore easy to couple or disconnect the first superconductor cable 40 and terminal 46 at ambient temperature. The clearance means that there is no electrical connection between the first superconductor cable 40 and the terminal 46 because they are mechanically isolated.

The terminal 46, or at least the first leg 48, is constructed of a material that contracts as it is cooled to cryogenic temperatures. The first leg 48 contracts more than the first superconductor cable 40 during cooling. Thus the first leg 48 firmly clamps onto the first superconductor cable 40 at cryogenic temperatures. The aperture 50 is configured to have sufficient length, from its opening into the first leg 48, such that there remains a significant overlap of the first leg 48 and the first superconductor cable 40 when at cryogenic temperatures in order to guarantee a good electrical connection with very low impedance.

The termination unit 38 also includes a cooling system 52. The cooling system 52 is arranged to enclose and cool the primary system 39 to cryogenic temperatures. The cooling system may comprise a cooling manifold 54 surrounded by a cryostat void 56. The cryostat void 56 is a vacuum and acts to isolate the termination unit 38 from higher temperatures, particularly from ambient temperatures. The cooling system may define zones A, B, C which may be maintained at different cryogenic temperatures. Zone A includes the terminal 46 and first leg 48. It may be maintained at a low cryogenic temperature. Zone B includes the first superconducting coil 42 and first auxiliary magnetising coil 44. It may be maintained at a higher temperature, although cryogenic, so that it is the first zone to heat beyond the critical temperature in the event of heating, whether deliberate in order to perform maintenance or due to a fault. Zone C includes part of the first superconductor cable 40 and is arranged to fluidly couple to coolant surrounding a superconducting component, which may be a continuation of the first superconductor cable 40, outside the termination unit 38. Alternatively there may be more cooling zones or fewer cooling zones.

The cooling manifold 54 supplies coolant to other portions of the cooling system, and provides some cooling by its proximity to the zones A, B, C. The coolant may be liquid or gas. Cooling may be effected by conduction, convection or a combination or both.

Figure 3:
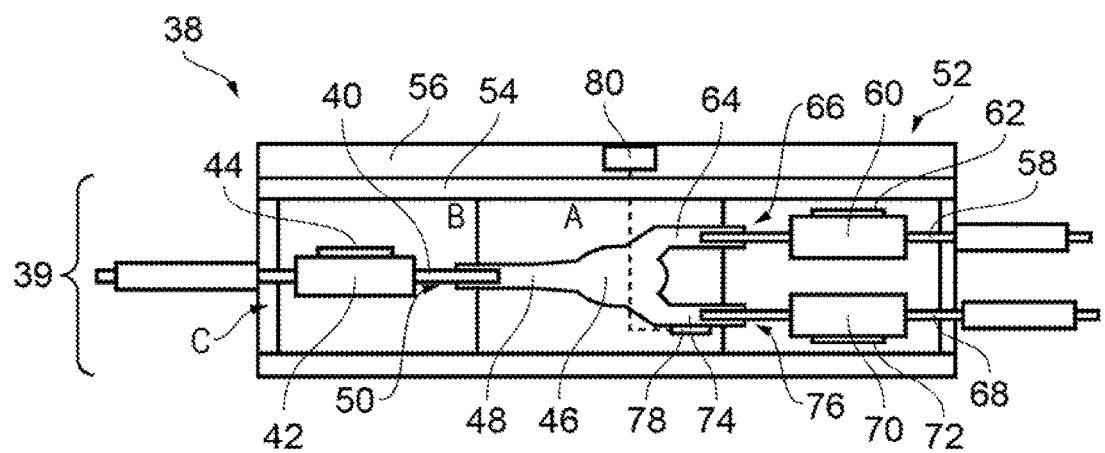
FIG. 3 is a schematic of a termination unit.

The cooling manifold 54 is illustrated extending across cooling zones A, B and C of the primary system 39; this is across the top of FIG. 3. Optionally the cooling manifold 54 may also extend across the bottom of the cooling zones A, B and C; this is across the bottom in FIG. 3. This optional bottom portion may be fluidly coupled to the top portion or may be a separate cooling manifold for additional control or redundancy. The cryostat void 56 fully surrounds the cooling manifold 54.

The primary system 39 may also include a second superconductor cable 58, an optional second superconducting coil 60 and an optional second auxiliary magnetising coil 62 arranged in the same manner as the first superconductor cable 40, first superconducting coil 42 and first auxiliary magnetising coil 44. The terminal 46 may include a second leg 64 that defines an internal aperture 66 sized and shaped to receive the end of the second superconductor cable 58. The second leg 64 defines a clearance around the second superconductor cable 58 at ambient temperatures and firmly clamps onto the second superconductor cable 58 when cooled to cryogenic temperatures.

Thus the terminal unit 38 may be used to electrically and mechanically couple together the first and second superconductor cables 40, 58 through the terminal 46. Advantageously the couple is made at cryogenic temperatures so the losses associated with making a connection to ambient temperature are avoided.

The primary system 39 may also include a third superconductor cable 68, an optional third superconducting coil 70 and an optional third auxiliary magnetising coil 72 arranged in the same manner as the first superconductor cable 40, first superconducting coil 42 and first auxiliary magnetising coil 44. The terminal 46 may include a third leg 74 that defines an internal aperture 76 sized and shaped to receive the end of the third superconductor cable 68. The third leg 74 defines a clearance around the third superconductor cable 68 at ambient temperatures and firmly clamps onto the third superconductor cable 68 when cooled to cryogenic temperatures.

Thus the terminal unit 38 may also be used to electrically and mechanically couple together the first and third superconductor cables 40, 68, or the second and third superconductor cables 58, 68, or the first, second and third superconductor cables 40, 58, 68 through the terminal 46. Advantageously the couple is made at cryogenic temperatures so the losses associated with making a connection to ambient temperature are avoided.

Where the primary system 39 comprises the first, second and third components there may also be a switch 78. The switch is mounted to the terminal 46 to provide good thermal and electrical connection. The current may flow into the terminal 46 through the first superconductor cable 40. The switch 78 is arranged to switch current flow to either the second superconductor cable 58 or to the third superconductor cable 68. Specifically, the switch 78 is coupled to the auxiliary magnetising coils 62, 72 and causes them to change the magnetic field experienced by the superconducting coils 60, 70 and therefore change the balance of impedance they otherwise experience. Thus the second superconducting coil 60 may be controlled up to quench by applying, via the second auxiliary magnetising coil 62, a magnetic field. Quench occurs when the magnetic field is greater than its critical field. Increasing the magnetic field causes the resistance in the second superconductor cable 58 to increase significantly, due to rising impedance before quench, so the current flows through the third superconductor cable 68 in preference because it is the path of lesser impedance. Thus the impedance balance between the superconductor coils 60, 70 is altered and the current flows preferentially through the third superconductor cable 68. Depending on the size of the applied magnetic field some current may still flow through the second superconductor cable 58. Similarly the opposite current flow control can be achieved by maintaining the second auxiliary magnetising coil 62 well below the critical field and increasing the field produced by the third auxiliary magnetising coil 72 so that the third superconducting coil 70 has increased impedance instead.

The switch 78 may be connected to a control system 80. The control system 80 is configured to control the switch 78 in order to switch the current flow between the second and third superconductor cables 58, 68. The control system 80 and switch 78 are used for planned, normal operation. Therefore there is no requirement for a very fast acting switch 78 or control system 80. Consequently the control system 80 and switch 78 may each be off the shelf products, which is cost-effective. As will be described below, in fault conditions the control system 80 and switch 78 are bypassed.

There may be one switch 78 for the second superconductor cable 58 and another switch 78 for the third superconductor cable 68. Both switches 78 would then be controlled together by the control system 80. Alternatively there may be one switch 78 for both the second and third superconductor cables 58, 68.

The switch 78 and control system 80 may also be used to compensate for any mismatch between the resistance of the second and third superconductor cables 58, 68. Optionally the second and third superconductor cables 58, 68 may also be resistance-matched with the first superconductor cable 40.

The cooling system 52 may also be arranged to enclose and cool the optional components of the primary system 39. Thus zone A may enclose and cool the whole of the terminal 46. Zone B may enclose and cool the second superconductor cable 58, optional second superconducting coil 60 and optional second auxiliary magnetising coil 62. Where included, zone B may also enclose and cool the third superconductor cable 68, optional third superconducting coil 70 and optional third auxiliary magnetising coil 72. Zone C may enclose and cool the interface of the second and third superconductor cables 58, 68 to the coolant surrounding superconducting components outside the termination unit 38. The superconducting components may be continuations of the second and third superconductor cables 58, 68.

The cooling system 52 may be common to the whole of the primary system 39 or may be provided as two or more similar cooling systems 52. Where two or more cooling systems 52 are provided they may be supplied from a common coolant source or may have their own coolant sources.

Figure 5:
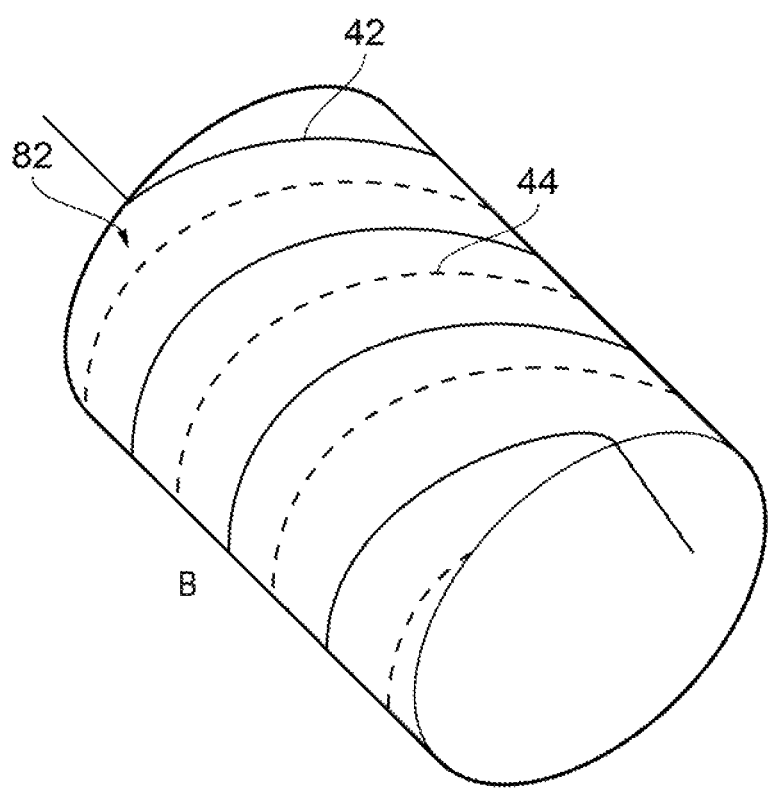
FIG. 5 is a perspective illustration of a superconducting coil and an auxiliary magnetising coil.

Both the first superconducting coil 42 and the first auxiliary magnetising coil 44 may be wound about a former 82, as illustrated in FIG. 5. The former 82 may be cylindrical, as illustrated, and may be constructed of a metal or metal alloy, a ceramic, a plastic or a composite material. For example the former 82 may be constructed of alumina, anodised aluminium, epoxy resin or a glass reinforced composite material. The purpose of the former 82 is firstly to correctly orientate the first superconducting coil 42 and first auxiliary magnetising coil 44. Secondly its purpose is to provide a controlled temperature for the coils 42, 44. Thirdly it provides mechanical support, particularly to react the forces generated when the first superconducting coil 42 is forced to quench.

Similarly the second superconducting coil 60 and second auxiliary magnetising coil 62 may be wound about a former 82, and the third superconducting coil 70 and third auxiliary magnetising coil 72 may be wound about a former 82.

Figure 4:
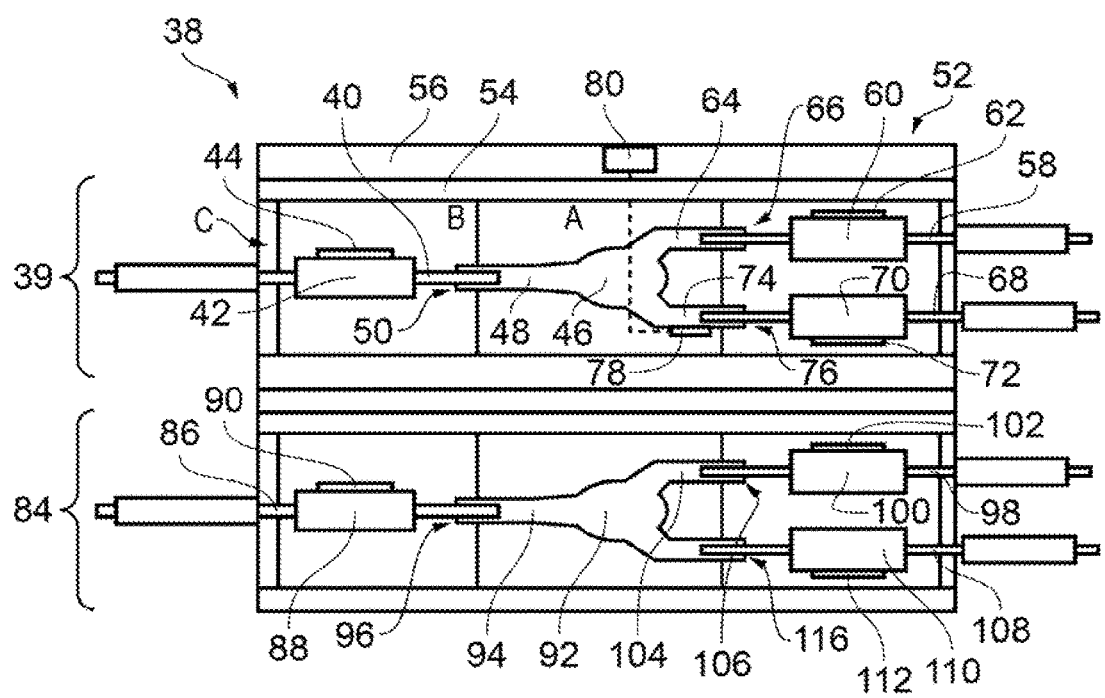
FIG. 4 is a schematic of a termination unit.

As shown in FIG. 4, the termination unit 38 may include a secondary system 84. The secondary system 84 is substantially the same as the primary system 39. Thus it comprises a fourth superconductor cable 86, an optional fourth superconducting coil 88 and an optional fourth auxiliary magnetising coil 90. The secondary system 84 also includes a second terminal 92 which has a fourth leg 94. The fourth leg 94 defines an aperture 96 which is sized and shaped to receive the fourth superconductor cable 86. The second terminal 92, like the terminal 46, is formed of a material that shrinks between ambient and cryogenic temperatures so that the aperture 96 in the fourth leg 94 has a clearance about the fourth superconductor cable 86 at ambient temperature but clamps firmly onto the fourth superconductor cable 86 at cryogenic temperatures. Thus there is mechanical and electrical isolation at ambient temperatures but good electrical connection at cryogenic temperatures.

The secondary system 84 may also include a fifth superconductor cable 98, an optional fifth superconducting coil 100 and an optional fifth auxiliary magnetising coil 102 arranged in the same manner as the second superconductor cable 58, second superconducting coil 60 and second auxiliary magnetising coil 62. The second terminal 92 may include a fifth leg 104 that defines an internal aperture 106 sized and shaped to receive the end of the fifth superconductor cable 98. The fifth leg 104 defines a clearance around the fifth superconductor cable 98 at ambient temperatures and firmly clamps onto the fifth superconductor cable 98 when cooled to cryogenic temperatures.

Thus the terminal unit 38 may be used to electrically and mechanically couple together the fourth and fifth superconductor cables 86, 98 through the second terminal 92. Advantageously the couple is made at cryogenic temperatures so the losses associated with making a connection to ambient temperature are avoided.

The secondary system 84 may also include a sixth superconductor cable 108, an optional sixth superconducting coil 110 and an optional sixth auxiliary magnetising coil 112 arranged in the same manner as the third superconductor cable 68, third superconducting coil 70 and third auxiliary magnetising coil 72. The second terminal 92 may include a sixth leg 114 that defines an internal aperture 116 sized and shaped to receive the end of the sixth superconductor cable 108. The sixth leg 114 defines a clearance around the sixth superconductor cable 108 at ambient temperatures and firmly clamps onto the sixth superconductor cable 108 when cooled to cryogenic temperatures.

Thus the terminal unit 38 may be used to electrically and mechanically couple together the fourth and sixth superconductor cables 86, 108, or the fifth and sixth superconductor cables 98, 108, or the fourth, fifth and sixth superconductor cables 86, 98, 108 through the second terminal 92. Advantageously the couple is made at cryogenic temperatures so the losses associated with making a connection to ambient temperature are avoided.

The fourth superconducting coil 88 and fourth auxiliary magnetising coil 90, the fifth superconducting coil 100 and fifth auxiliary magnetising coil 102, and the sixth superconducting coil 110 and sixth auxiliary magnetising coil 112, may each be wound about a former 82 in the same manner as the first superconducting coil 42 and first auxiliary magnetising coil 44.

The cooling system 52 may be arranged to enclose and cool the secondary system 84 in a similar manner to the primary system 39. Thus zone A may enclose and cool the second terminal 92. Zone B may enclose and cool the fourth superconductor cable 86, optional fourth superconducting coil 88 and optional fourth auxiliary magnetising coil 90. Where included, zone B may also enclose and cool the fifth superconductor cable 98, optional fifth superconducting coil 100 and optional fifth auxiliary magnetising coil 102; and the sixth superconductor cable 108, optional sixth superconducting coil 110 and optional sixth auxiliary magnetising coil 112. Zone C may enclose and cool the interface of the fourth, fifth and sixth superconductor cables 86, 98, 108 to the coolant surrounding superconducting components outside the termination unit 38. The superconducting components may be continuations of the fourth, fifth and sixth superconductor cables 86, 98, 108.

The cooling system 52 may be common to both the primary and the secondary systems 39, 84. Thus zone A may enclose and cool both terminal 46 and second terminal 92. Zone B may enclose and cool the first superconductor cable 40, optional first superconducting coil 42, optional first auxiliary magnetising coil 44, fourth superconductor cable 86, optional fourth superconducting coil 88 and optional fourth auxiliary magnetising coil 90. Where included, zone B may also enclose and cool the second superconductor cable 58, optional second superconducting coil 60 and optional second auxiliary magnetising coil 62; the third superconductor cable 68, optional third superconducting coil 70 and optional third auxiliary magnetising coil 72; the fifth superconductor cable 98, optional fifth superconducting coil 100 and optional fifth auxiliary magnetising coil 102; and the sixth superconductor cable 108, optional sixth superconducting coil 110 and optional sixth auxiliary magnetising coil 112. Zone C may enclose and cool the interface of each of the first to sixth superconductor cables 40, 56, 68, 86, 98, 108 to the coolant surrounding them outside the termination unit 38.

The cooling manifold 54 is illustrated extending across cooling zones A, B and C of the primary system 39; this is across the top of FIG. 4. Optionally the cooling manifold 54 may also extend across the cooling zones A, B and C of the secondary system 84; this is across the bottom in FIG. 4. This optional bottom portion may be fluidly coupled to the top portion or may be a separate cooling manifold for additional control or redundancy. The cryostat void 56 fully surrounds the cooling manifold 54.

Where the termination unit 38 includes both the primary and secondary systems 39, 84, as illustrated in FIG. 4, the first superconductor cable 40 and fourth superconductor cable 86 may be poles of the same cable in a DC network. Thus the first superconductor cable 40 may be the positive pole and the fourth superconductor cable 86 may be the negative pole. A superconducting component outside the termination unit 38 may comprise both positive and negative poles. In this case the poles are isolated and become the first superconductor cable 40, carrying the positive pole, and the fourth superconductor cable 86, carrying the negative pole. Where only the primary system 39 is included in the termination unit 38 the negative pole may be connected to an earth point.

Where the termination unit 38 includes both the primary and secondary systems 39, 84, as illustrated in FIG. 4, the first superconductor cable 40 and fourth superconductor cable 86 may be phases of a two-phase current in an AC network. Thus the first superconductor cable 40 may be a first phase and the fourth superconductor cable 86 may be a second phase. A superconducting component outside the termination unit 38 may comprise both first and second phases. In this case the phases are isolated and become the first superconductor cable 40, carrying the first phase, and the fourth superconductor cable 86, carrying the second phase.

The termination unit 38 may include more than one secondary system 84. Where the termination unit 38 includes the primary system 39 and more than one secondary system 84, the first superconductor cable 40 and each fourth superconductor cable 86 may be phases of a multiphase current in an AC network. Thus the first superconductor cable 40 may be a first phase and each fourth superconductor cable 86 may be another phase. A superconducting component outside the termination unit 38 may comprise all the phases. In this case the phases are isolated and become the first superconductor cable 40, carrying the first phase, and each fourth superconductor cable 86, carrying one of the other phases. Thus a termination unit 38 for a three-phase arrangement may have a primary system 39 for the first phase, one secondary system 84 for the second phase and a second secondary system 84 for the third phase.

The switch 78 may be connected to both the second and third auxiliary magnetising coils 62, 72 and to the fifth and sixth auxiliary magnetising coils 102, 112. These can be paired so that one of the auxiliary magnetising coils 62, 72 in the primary system 39 is paired with one of the auxiliary magnetising coils 102, 112 in the secondary system 84, whilst the other of the coils are also paired. Thus when the switch 78 acts to increase the field of the second auxiliary magnetising coil 62 it also increases the field of the paired coil, for example the fifth auxiliary magnetising coil 102. Similarly when the switch 78 acts to increase the field of the third auxiliary magnetising coil 72 it also increases the field of the paired coil, for example the sixth auxiliary magnetising coil 112. The switch 78 may be mounted to the second terminal 92 instead of the terminal 46.

In normal steady state operation the temperature of cooling zone B can be controlled to determine whether the superconductor cables are superconducting or quenched. For dynamic operation the field generated by the auxiliary magnetising coils can be controlled to quench particular superconductor cables. By setting the cooling zone B to be warmer than cooling zone A the superconducting coils quench before other parts of the superconductor cables because they operate closer, albeit only slightly, to their critical temperatures. The same effect can be achieved by forming the superconducting coils of a different material, or providing a sheath with different properties, compared to other parts of the superconductor cables. In normal conditions the quenching of the superconducting coils increases its resistance rapidly and therefore limits the $I^2R$ heating and consequently limits the current and increases the temperature sufficiently to heat the legs of the terminal 46 to open the clearance and thus mechanically isolate the superconductor cables from the terminal 46. This is achieved with the current low enough to prevent low voltage arcing.

The preferential quenching of the superconducting coils is advantageous in extreme fault conditions because the superconducting coils melt due to the excessive current and/or temperature applied. Therefore the superconducting coils mechanically isolate the superconductor cables from the terminal 46. In this case the superconducting coils must be replaced before the termination unit 38 can be used again because they will no longer superconduct. Thus each superconducting coil acts as a fuse for its branch of the termination unit 38.

Advantageously the termination unit 38 described enables a fully superconducting network which operates at superconducting temperatures and pressures instead of including portions that operate at ambient temperature and/or pressure. This means that the network can operate at lower voltage and higher current than is possible with ambient temperature components, and is therefore more efficient.

The terminal 46 and second terminal 92 may each be arranged so that their legs are parallel and aligned. This means that the ends of the superconductor cables may overlap. Thus the first superconductor cable 40 overlaps the second superconductor cable 58 and may also overlap the third superconductor cable 68. Similarly the fourth superconductor cable 86 overlaps the fifth superconductor cable 98 and may also overlap the sixth superconductor cable 108. The length of the terminal 46 and second terminal 92, as well as the absolute and relative lengths of the legs and cables, affects the level of resistance available and the dynamics of the current flow control.

The terminal 46 and second terminal 92 may each be configured as a bus bar. Advantageously, because the terminal 46 and second terminal 92 can each have one or more input legs, such as the first leg 48 and fourth leg 94, it is simple to make multiple parallel connections for redundancy. Similarly, because the terminal 46 and second terminal 92 can each have one or more output legs, such as the second leg 64, third leg 74, fifth leg 104 and sixth leg 114, it is simple to make multiple parallel connections and to control and/or balance the current flow between the legs.

Although a DC network 24 was described with respect to FIG. 2 the termination unit 38 is equally applicable in an AC network. In such an AC network the AC/DC converters 34 could be replaced by superconducting transformers.

The switch 78 could be mounted outside the termination unit 38 instead of to the terminal 46 or to the second terminal 92. The switch 78 may be electronic, electrical or mechanical.

Optionally heaters may be provided at each leg 48, 64, 74, 94, 104, 114 to offer local control of temperature rises. Advantageously this enables temperature rises to be balanced across the termination unit 38.

The termination unit 38 finds utility in high power electrical networks. Such networks may be DC or AC. For example, the termination unit 38 may be used in a distributed propulsion electrical network 24 for an aircraft; in an electrical network in a marine vessel; in an electrical network for land-based energy distribution; in an electrical network in an industrial plant; or in an electrical network in a vehicle such as a railway engine or road vehicle e.g. a car, lorry or truck.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A termination unit for a superconductor network, the termination unit comprising a primary system that comprises:
   a first superconductor cable; and
   a terminal comprising a first leg, the first leg comprising an aperture configured to receive the first superconductor cable, the first leg defining a clearance about the first superconductor cable at ambient temperature and arranged to firmly clamp onto the first superconductor cable at a cryogenic temperature;
   the termination unit comprising a cooling system arranged to enclose and cool the primary system to cryogenic temperatures; and a first superconducting coil and a first auxiliary magnetising coil, each coil wound around the first superconductor cable.

2. A termination unit as claimed in claim 1, the primary system further comprising:
a second superconductor cable; and
the terminal comprising a second leg, the second leg comprising an aperture configured to receive the second superconductor cable, the second leg defining a clearance about the second superconductor cable at ambient temperature and arranged to firmly clamp onto the second superconductor cable at a cryogenic temperature.

3. A termination unit as claimed in claim 2, the primary system further comprising:
a third superconductor cable; and
the terminal comprising a third leg, the third leg comprising an aperture configured to receive the third superconductor cable, the third leg defining a clearance about the third superconductor cable at ambient temperature and arranged to firmly clamp onto the third superconductor cable at a cryogenic temperature.

4. A termination unit as claimed in claim 2, the primary system further comprising a second superconducting coil and a second auxiliary magnetising coil, each coil wound around the second superconductor cable.

5. A termination unit as claimed in claim 3, the primary system further comprising a switch configured to switch current flow between the second and third superconductor cables.

6. A termination unit as claimed in claim 5 further comprising a control system, the control system configured to control the switch.

7. A termination unit as claimed in claim 5 wherein there is one switch for each superconducting coil or wherein there is one switch for both the second and third superconducting coils.

8. A termination unit as claimed in claim 1 wherein turns of each superconducting coil alternate with turns of the respective auxiliary magnetising coil.

9. A termination unit as claimed in claim 1 wherein each superconducting coil and respective auxiliary magnetising coil are wound about a former; the former comprises alumina, anodised aluminium, epoxy resin or a composite material.

10. A termination unit as claimed in claim 1 further comprising a cooling manifold arranged to deliver coolant to the cooling system.

11. A termination unit as claimed in claim 1 wherein the cooling system is arranged into a first zone enclosing and cooling the terminal.

12. A termination unit as claimed in claim 1 wherein the cooling system is further arranged into a second zone enclosing and cooling the superconducting coils and the auxiliary magnetising coils; and further comprising a third zone configured to interface between the termination unit and a superconducting component outside the termination unit.

13. A termination unit as claimed in claim 1 further comprising a secondary system that comprises:
a fourth superconductor cable; and
a second terminal comprising a fourth leg, the fourth leg comprising an aperture configured to receive the fourth superconductor cable, the fourth leg defining a clearance about the fourth superconductor cable at ambient temperature and arranged to firmly clamp onto the fourth superconductor cable at a cryogenic temperature.

14. A termination unit as claimed in claim 13, the secondary system further comprising a fourth superconducting coil and a fourth auxiliary magnetising coil, each coil wound around the fourth superconductor cable.

15. A termination unit as claimed in claim 1 wherein the first superconductor cable comprises a positive pole.

16. A termination unit as claimed in claim 13 wherein the first superconductor cable comprises a positive pole and the fourth superconductor cable comprises a negative pole.

17. A termination unit as claimed in claim 13 further comprising one or more additional secondary systems and wherein the first superconductor cable comprises a first phase of a multiphase arrangement and the fourth superconductor cable of each secondary system comprises a further phase of a multiphase arrangement.

18. A termination unit as claimed in claim 13 further comprising one or more secondary systems and wherein the cooling system is arranged to enclose and cool each secondary system to cryogenic temperatures.

19. A superconductor network including a termination unit as claimed in claim 1.

* * * * *